July 22, 1969    H. M. GAJEWSKI ET AL    3,456,965
MEANS FOR COUPLING A PAIR OF FLUID CONDUITS
Filed Feb. 23, 1967      2 Sheets-Sheet 1
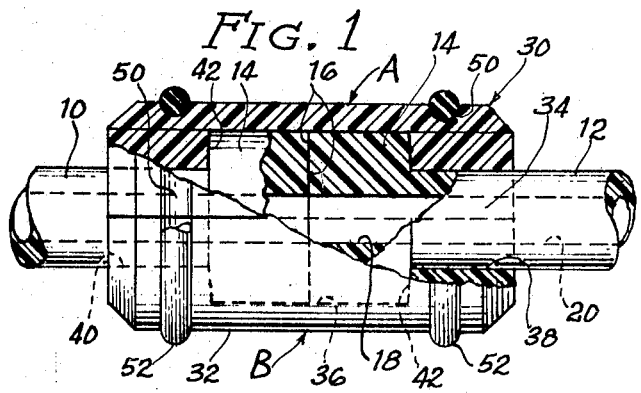
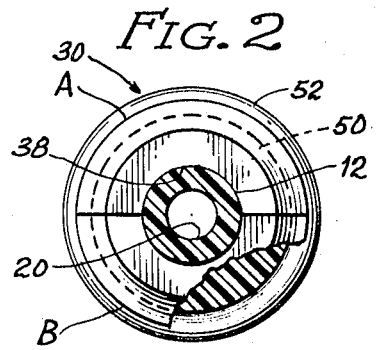
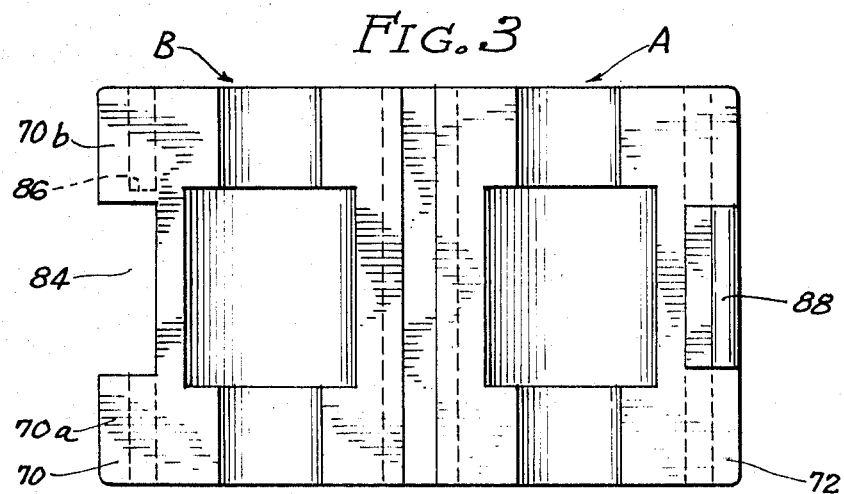
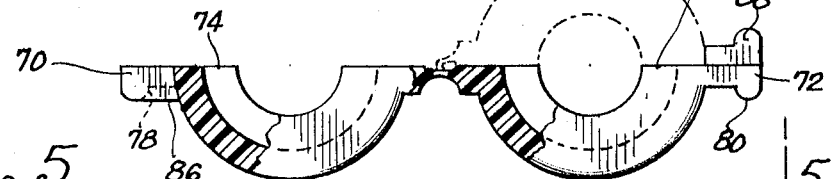
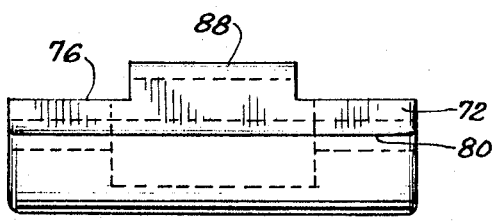
INVENTORS
Henry M. Gajewski
Robert R. Harrison
Donald Snyder
Richard J. —— Att'ys

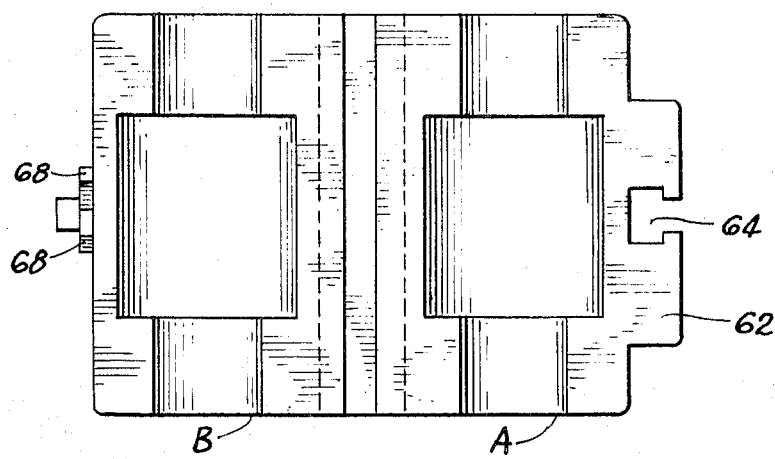
Fig. 6
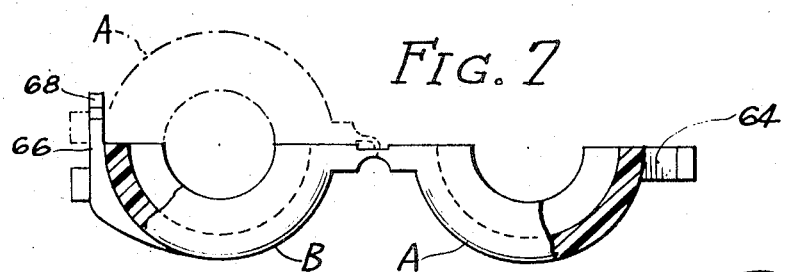
Fig. 7
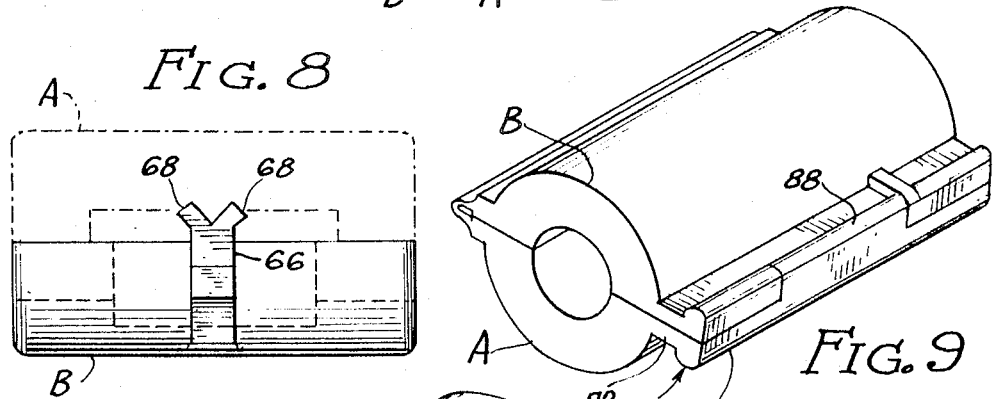
Fig. 8
Fig. 9
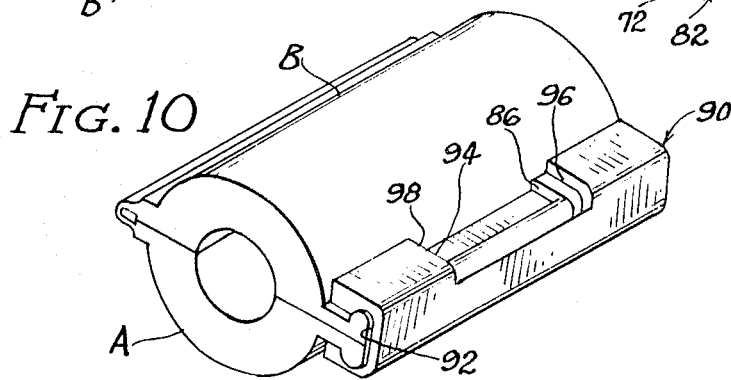
Fig. 10

United States Patent Office 3,456,965
Patented July 22, 1969

3,456,965
MEANS FOR COUPLING A PAIR OF
FLUID CONDUITS
Henry M. Gajewski, Morton Grove, and Robert R. Harrison, Park Ridge, Ill., and Donald Snyder, Brooklyn, N.Y., assignors to Baxter Laboratories, Inc., Morton Grove, Ill., a corporation of Delaware
Filed Feb. 23, 1967, Ser. No. 618,214
Int. Cl. F16l 31/00
U.S. Cl. 285—260                                      4 Claims

ABSTRACT OF THE DISCLOSURE

Tube coupling for joining the free ends of a pair of fluid conduits in which the ends are each provided with enlarged end members and coupling is effected by a sleeve subdivided axially into parts which, when joined together about the end members, form a sleeve member having a central bore with a cross-section corresponding to the cross-section of the end members and a length which is the same or slightly less than the total length of the two end members whereby the end members are pressed together in end to end abutting relation when retained within the sleeve to effect a continuous sealed passage therebetween with bores of smaller dimension continuing in opposite directions through the remainder of the sleeve for the passage of the connecting conduit therethrough and means for securing the sleeve sections in their assembled relation.

---

This invention relates to means for effecting a separable connection between tubular members. Particularly it relates to a partable coupling for a shunt of the type used for extracorporeal flow of body fluids.

A shunt of the designated type comprises a tubular member with a pair of tube sections having opposite end sections inserted rather permanently in the lumen of a pair of body ducts, such as a vein and an artery, for establishing extracorporeal blood flow. The tubular sections have a pair of proximate end portions which are adapted for placing body circulation in circuit with a processing device, for example, an oxygenator or artificial kidney, to treat blood extracorporeally. When the tube sections are not conditioned for treatment, their proximate end portions are maintained in a coupled condition for flow directly from the artery to the vein.

It is an object of the present invention to provide an improved coupling for a pair of tube sections.

It is another object of the invention that said coupling be adapted for flexible tubing of the type suited for use as a shunt for body fluids.

It is a further object of the invention that the coupling is adapted for easy mounting and removal while being adapted to resist disengagement resulting from inadvertence or accident.

These and other objects and advantages of this invention will hereinafter appear and for purposes of illustration, but not of limitation, an embodiment of the invention is shown in the accompanying drawings in which:

FIG. 1 is a front elevational view partially in section of the coupling elements in their coupled relation;

FIG. 2 is an end elevational view partially in section of the assembly shown in FIG. 1;

FIG. 3 is a top plan view of a modification in a coupling member embodying the features of this invention;

FIG. 4 is an elevational view of the coupling member shown in FIG. 3;

FIG. 5 is an end elevational view of the coupling member shown in FIG. 3;

FIG. 6 is a top plan view of a still further modification in a coupling member embodying the features of this invention;

FIG. 7 is a side elevational view of the coupling member shown in FIG. 6;

FIG. 8 is an end elevational view of the coupling member shown in FIG. 6;

FIG. 9 is a perspective view of the assembled sleeve segments shown in FIGS. 3–5; and FIG. 10 is a perspective view similar to that of FIG. 9 showing the slide fastener in position of use on the assembled segments.

Referring now to the drawings, illustration is made of a pair of fluid conduits 10 and 12 formed of a suitable flexible material, such as silicone rubber, polypropylene, or other synthetic rubber, metal or plastic material of medical grade.

One end of the conduit 10 is adapted to be connected to a vein and one end of the conduit 12 is adapted to be connected to an artery. The free ends of the fluid conduits 10 and 12 are each formed with end pieces 14 of increased cross-sectional dimension but with flat end faces 16 and with bores 18 extending therethrough dimensioned to have an inside diameter which is the same as and constitutes a continuation of the bore 20 through the fluid conduits.

In practice, the end pieces 14 can be molded to form an integral part of the conduit or they can be formed of separate sleeve sections having an inside diameter corresponding to the outside diameter of the conduit whereby the sleeve sections can be telescoped onto the ends of the conduit for attachment thereto in sealing relationship, as by the use of a suitable adhesive or weld. When formed of a separate section, the sleeve members can be formed of such materials as silicone rubber, polypropylene and the like plastic material, preferably, though not necessarily characterized by greater stiffness than the material making up the conduits, or they may be formed of the same material as the conduits.

The end pieces 14 are preferably in the form of tubular sections of circular shape but they may be formed of other shapes, such as oval, square, hexagonal, octagonal, or other polygonal shape.

The coupling member 30 for releasably joining the free ends of the fluid conduits in sealing relation to define a continuous passage therebetween comprises an elongate sleeve member 32 dimensioned to have a length greater than the two end sections 14 and a bore 34 extending continuously therethrough with a bore 36 of larger dimension through the midsection and contiguous bores 38 and 40 of smaller dimension through the end portions of the sleeve section to define abutments or cam faces 42 therebetween.

The inner bore 36 of larger dimension is shaped peripherally to correspond with the peripheral contour of the end pieces 14 and it is dimensioned to correspond with the outside dimension of the end pieces 14 to receive the end pieces in fitting relationship therein. The central bore 36 is also dimensioned to have a length corresponding to the combined lengths of the two end pieces 14 of the fluid conduits 10 and 12 and preferably it is slightly less than the combined lengths of the two end pieces whereby the end pieces will be engaged by the abutments tightly to press the end faces 16 of the end pieces 14 into abutting relationship one with the other to effect a sealing engagement therebetween while aligned in end to end relationship to define a continuous unobstructed passage therebetween. The abutments 42 or the rear walls of the end pieces or both can be formed with a slight inward taper on the abutment or outward taper on the end pieces to provide a camming engagement therebetween which is effective to force the end pieces into sealing engagement when confined within the bore 36 of larger dimension in the assembled relation. The bores 40 in the ends of the sleeve section are dimensioned to correspond with the outside diameter of the fluid conduits 10 and 12 for enabling the conduits freely to extend therethrough.

In order to enable release of the end pieces for attachment to a processing device, the sleeve section 30 is split axially into two half sections A and B for displacement into and out of sealing engagement with the end pieces. Means are provided for securing the half sections in their assembled relationship to form the sleeve coupling In the modification illustrated in FIGS. 1 and 2, the half sections A and B are each formed with axially spaced apart recesses 50 in circumferentially aligned portions of the outer walls to provide an annular groove adapted to receive O rings 52 resiliently to secure the half sections in their assembled relationship about the end pieces to effect the desired coupling. While it is preferred to subdivide the sleeve member into two half sections, it will be understood that the sleeve section can be subdivided into a greater number of sections for assembly to complete the coupling.

In the modifications shown in FIGS. 3–8, the sleeve forming half sections are molded of one piece with the half sections A and B joined by an integral flexible connecting strip extending crosswise between their peripheral surfaces diametrically aligned with the surface of the half sections. Thus the half sections can be folded into and out of coupling position.

In the preferred modification shown in FIGS. 3–5, 9 and 10, illustration is made of a type of slide fastener which can permanently be retained by the integrally joined sleeve sections releasably to latch the sleeve sections in their assembled relation. For this purpose, each half section A and B is formed with outwardly extending radial web portions 70 and 72 having flattened upper surfaces 74 and 76 flush with the surfaces of the half sections with ribs 78 and 80 on the outer end portions extending downwardly in the direction away from the flattened surfaces to define a T-shaped member 82 therebetween when the half sections are arranged in their assembled relationship to form the completed sleeve with the flattened surfaces 74 and 76 of the web sections in abutting relation.

The web section 70 of the half section B is formed with a pair of laterally spaced apart web sections 70ª and 70ᵇ to define a slotted portion 84 in between with a blocking member in the form of a wall 86 extending inwardly from the rib to the sleeve section across the inner end of the web section 70ᵇ.

The other web member 72 is formed with a central integral portion 88 corresponding in cross-section to the web portion 70 and dimensioned to have a width corresponding to the width of the spaced relationship between the web portions 70ª and 70ᵇ so as to be received in fitting relationship between said web portions when the sleeve sections are in their assembled relationship, as shown in FIG. 9, with the spaced relationship between the web portions 70ª and 70ᵇ being greater than the width of said portions. Thus when the sleeve sections are joined in their assembled relationship to complete the sleeve member, as shown in FIG. 9, the two interfitting web sections 70 and 72 define a continuous T-member therebetween.

The elements are adapted releasably to be retained in their assembled relationship by a slide member 90 dimensioned to have a length corresponding to the width of the web sections 70 and 72 with a continuous T-slot 92 extending crosswise therethrough having a cross-section corresponding to the T-members formed by the web sections when in their assembled relationship but with a central cutout portion 94 overlying the rib section 88 and dimensioned to have a width corresponding to about the width of the latter.

The slide member 90 can be positioned onto the web section A when separated from the web section B, while the sleeve sections are in open position. With the slide offset to the right in FIG. 10, with the cutout portion 94 aligned with the web portion 70ᵇ, the sleeve section A can be displaced to the assembled relationship to bring the web sections 70ª and 70ᵇ into abutting relationship with the web member 72. Lateral displacement of the slide member 90 in the direction to the left in FIG. 10 to latched position with the wall 96 of the slide in engagement with the stop 86 will operate to bring the web sections 70ª and 70ᵇ within the enclosed T-slots of the slide 90 to militate against separation of the web members from their assembled relationship.

Displacement of the slide 90 in the direction to the right to unlatching position with the wall 98 in engagement with the stop 86 will enable separation of the sleeve sections while the central T-section 88 of the web member 70 will be received within the enclosed T-slot of the slide to hold the slide onto the assembly in unlatching position.

In the modification illustrated in FIGS. 6–8, connection between the integral connected half section A and B is effected by an integral snap fastener in the form of a flange 62 extending radially outwardly from the peripheral surface of one half section A alongside its diametric surface with a T-slot 64 formed in the center thereof while the other half section B is formed with an arm 66 integral with the opposite side of the other half section in crosswise alignment with the T-slot and which extends perpendicularly to the plane of the diameter of the half section with the outward end portion of the arm slit to provide resilient divergent fingers 68 or a bulbous portion with the width of the arm dimensioned to correspond substantially with the width of the base of the T-slot 64 whereby the divergent fingers or bulbous portion on the end extends outwardly to project beyond the slot to prevent inadvertent displacement through the slot. When the half sections are folded to coupling position, the arm is displaced through the T-slot 64 to project the fingers or bulbous portions onto the opposite side of the web thereby releasably to hold the sleeve sections in their folded coupling position.

The following will illustrate the dimensional characteristics of the elements making up a typical coupling:

Tubular conduit:                                       Inches
- OD ---------------------------------- 3/16
- ID ----------------------------------- 7/64

End pieces:
- OD ---------------------------------- 5/16
- ID ----------------------------------- 3/16
- L ------------------------------------ 3/16

Coupler:
- Total length ------------------------- 3/4
- Narrow portion ---------------------- 3/16
- Central portion -------------------- 3/8–0–.005
- Small bore, OD --------------------- 3/16
- Large bore, OD --------------------- 5/16

In operation, the end pieces 14 of the pair of fluid conduits 10 and 12 are fitted into end to end abutting relationship in the central cavity of one of the half sections. The other half section is then fitted over the first to complete the sleeve coupling with the end pieces confined within the central bore of larger dimension. When the sleeve sections are pressed together to complete the sleeve coupling, the end pieces 14 are forced in the direction towards each other into tight abutting relationship by reason of the close fit within the central bore thereby to seal the end pieces in end to end relationship within the coupling while the fluid passages are aligned one with the other to define a continuous sealed passage for the flow of blood or other body fluid.

It will be apparent from the foregoing that we have provided a simple and effective means for coupling the end pieces of a pair of conduits having fluid passages to effect a continuous sealed communication between the passages without deviation or obstruction to the flow of fluid through the passages whereby an effective coupled relationship is established and whereby the coupled relationship can be uncoupled to release the end pieces for attachment to inlets and outlets of equipment for processing of the fluid materials normally passing through the conduits.

It will be understood that changes may be made in the details of construction, arrangement and operation and in the materials of which various elements are formed, without departing from the spirit of the invention.

We claim:

1. A coupling for releasably connecting the ends of a pair of fluid conduits having end pieces of a cross-sectional dimension greater than the conduits and comprising: a sleeve subdivided axially into two sleeve sections and dimensioned to have a length greater than the combined lengths of the end pieces, said sleeve having an axially extending bore with opposed portions and a medial portion, said opposed portions being of smaller dimension than the medial portion and proportioned to enable the fluid conduits to pass therethrough, the medial portion corresponding in dimension and shape to the end pieces and having a length which is no greater than the combined lengths of the end pieces; a pair of axially spaced apart abutments defined by said medial portion for pressing the end pieces together in the coupling to define a continuous sealed passage therebetween; flexible means integral with said sleeve on one side for enabling rocking movement of said sleeve sections between an open position for releasing the fluid conduits and a closed position for connecting the conduits, a pair of web members of one-half a T-section extending radially outwardly from the sleeve sections on the other side of said sleeve and disposed in abutting relation to define a complete T-section when said sleeve sections are in closed position, one of said web members comprising a pair of spaced apart web segments, the other of said web members having a central portion proportioned and arranged for engagement between said web segments when said sleeve sections are in closed position, and a slide with a slot proportioned for slidably receiving the complete T-section to latch the sleeve sections in closed position, said slide having a cutout of greater width than a web segment to enable it to pass through the slide when in its unlatching position.

2. A coupling as claimed in claim 1 in which the spaced relationship between the web segments is dimensioned to be greater than the width of the web segments.

3. A coupling as claimed in claim 1 which includes a stop at the inner end of one of the web segments in position to be engaged by the slide when displaced between latching and unlatching position.

4. In a tube coupling of the type comprising a sleeve with partable sections releasably securable along section edges extending longitudinally of the juncture of a pair of axially aligned adjoining tubes, the improvement comprising:

flexible means integral with said sleeve on one side for moving said sleeve sections between an opened position for releasing the tubes and a closed position for connecting the tubes;

a pair of spaced apart web segments projecting outwardly from one of said sections and arranged for alignment longitudinally of a tube juncture;

a web projecting outwardly from the other of said sections and proportioned for insertion between said web segments to close said coupling;

said web and web segments having holding means;

a channel shaped retainer arranged for sliding on said web and web segments longitudinally of a tube juncture when said coupling is closed and between a latched condition and unlatched condition, said retainer having means for cooperation with said holding means to secure said sections in a closed position, said retainer having a medial opening proportioned for movement therethrough of one of said web segments to open and close said coupling while said retainer is positioned on the other of said sections in the unlatched condition.

References Cited

UNITED STATES PATENTS

| | | | |
|---|---|---|---|
| 920,169 | 5/1909 | Neuberth | 285—419 |
| 1,801,261 | 4/1931 | Bailey | 285—421 X |
| 2,490,640 | 12/1949 | Lefevre-Selmer | 285—410 |
| 2,717,788 | 9/1955 | Raynes | 285—411 |
| 2,846,244 | 8/1958 | Parker | 285—409 |
| 3,186,744 | 6/1965 | Smith et al. | 285—421 X |
| 3,254,650 | 6/1966 | Collito | 128—334 |

FOREIGN PATENTS

| | | |
|---|---|---|
| 236,968 | 1/1962 | Australia. |
| 408,693 | 1/1910 | France. |

THOMAS F. CALLAGHAN, Primary Examiner

U.S. Cl. X.R.

128—334; 285—407, 419